2 Sheets—Sheet 1.
A. H. BAKER,
Assignor of one-half to H. L. PINNEY.
RAILROAD SWITCH SIGNAL.
No. 10,217. Reissued Oct. 17, 1882.
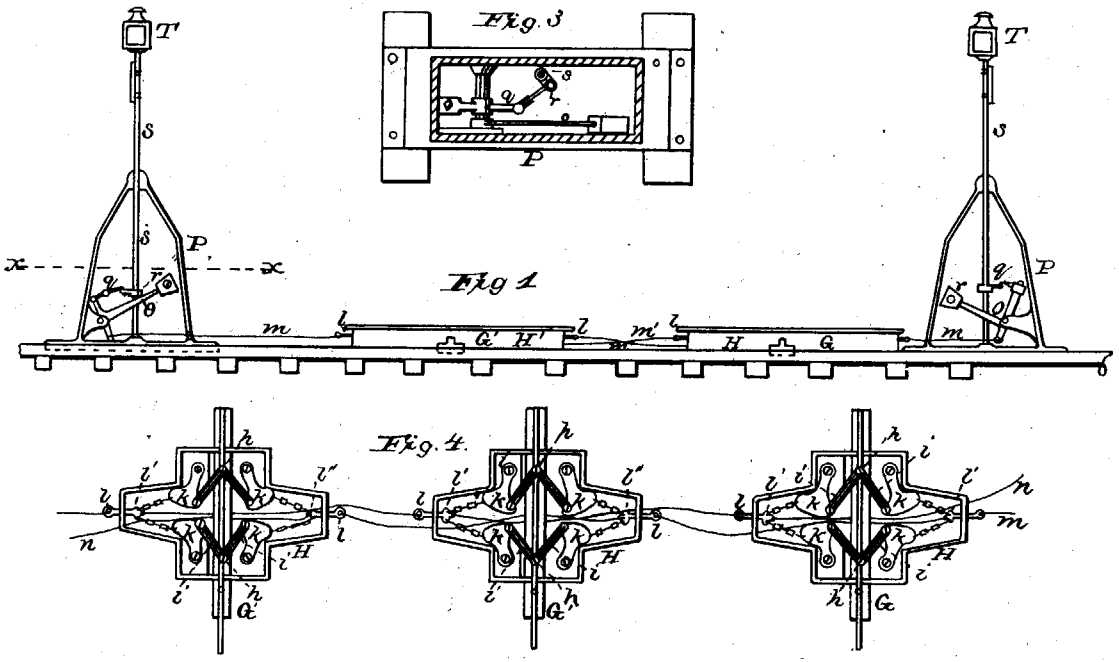
Witnesses
Chas. L. Burdett.
W. H. Marsh
Inventor.
Augustus H. Baker
By W. E. Simonds.
Atty
N. PETERS, Photo-Lithographer, Washington, D. C.

2 Sheets—Sheet 2.
A. H. BAKER,
Assignor of one-half to H. L. PINNEY.
RAILROAD SWITCH SIGNAL.
No. 10,217. Reissued Oct. 17, 1882.
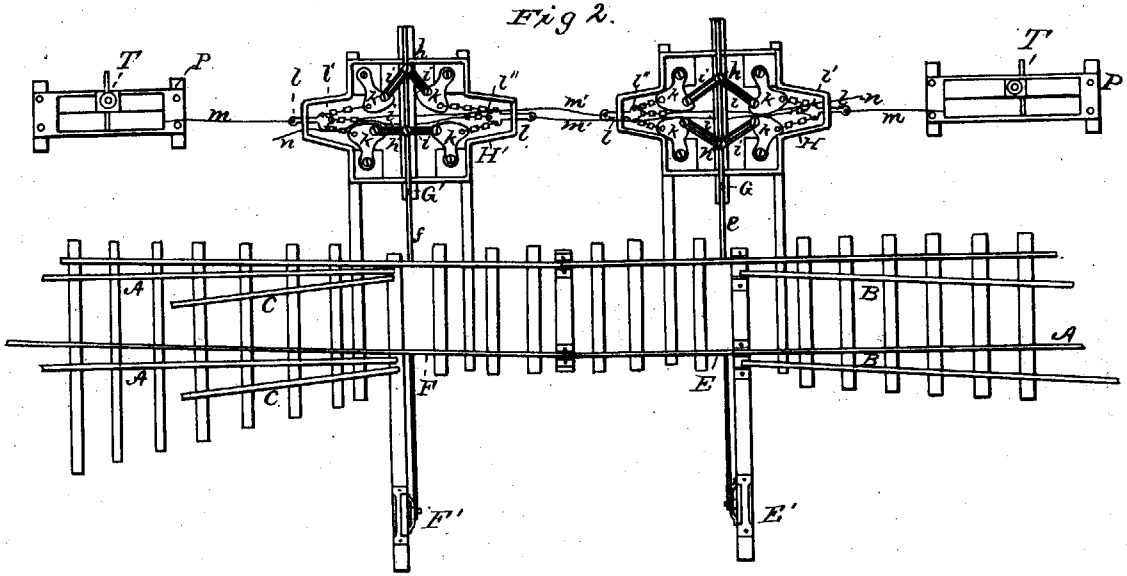
Witnesses
Chas. E. Burdett.
H. H. Marsh
Inventor.
Augustus H. Baker
By W. E. Simonds.
Atty.
N. PETERS, Photo-Lithographer, Washington, D. C.

UNITED STATES PATENT OFFICE.

AUGUSTUS H. BAKER, OF HARTFORD, ASSIGNOR OF ONE-HALF TO HENRY L. PINNEY, OF SOUTH WINDSOR, CONNECTICUT.

RAILROAD-SWITCH SIGNAL.

SPECIFICATION forming part of Reissued Letters Patent No. 10,217, dated October 17, 1882.

Original No. 229,075, dated June 22, 1880. Application for reissue filed April 20, 1882.

*To all whom it may concern:*

Be it known that I, AUGUSTUS H. BAKER, a citizen of the United States, residing at Hartford, in the county of Hartford and State of Connecticut, have invented certain new and useful Improvements in Railroad-Switch Signals, of which the following is a description, reference being had to the accompanying drawings, in which like letters and figures denote like parts.

Figure 1 is a side elevation of my present invention as applied to use. Fig. 2 is a top view of the same, the tops of the shifting-boxes being removed and the main connecting-wires uncovered. Fig. 3 is a detail view, showing in plan, below plane denoted by line *x x* of Fig. 1, the mechanism of the signal-case. Fig. 4 is a plan view, showing several of the shifting-boxes with their mechanism in position as when the main track is continuous.

My invention relates to improvements in railroad-switch signals; and it consists more particularly in such construction and arrangement of the parts making up the whole device that one or more switches may be connected to a main signal line or wire, and whatever number of switches are attached to the main signal-wire, if one only of the said switches remains misplaced (as to the main track) the signal will show "danger" until all the switches are set right; and it consists, further, in the capacity of said devices to operate equally well in connection with switches "throwing" either or both sides of the main track, and with signals established at any required distance on one or both sides of the switches, as hereinafter more fully described.

In the accompanying drawings, the letter A denotes any main railroad-track, and B C D side or branch tracks, either of which can be connected with the main track by means of the switches E or F, as required. The switch E is operated from any usual form of switch-stand, as E′, Fig. 2, and the shifting-box H and inclosed mechanism is placed on either side of the track or stand in any convenient position for connecting the switch, as by means of connecting rod *e* with the sliding bar G, which reciprocates in a line substantially transverse to the main track. Switch F, operated from stand F′, is connected by a similar rod, *f*, to a reciprocating bar, G′, appurtenant to shifting-box H′. Pins *h* are fixed in the sliding bars G G′ at points about equidistant from and on each side of the center of motion of the sliding bars, which are connected by means of links *i* or similar devices to the vibrating levers *k*, joined by short chains, flexible cords, or the like to the sliding arms *l*. The outer end of each of said arms *l* (on the side toward the nearest signal-case P) connects directly with the main wire *m*, which joins to and actuates the mechanism of the signal-cases, and the inner end, *l′*, is connected by a wire, *m′*, directly with the outer end of the nearest arm of the next shifting-box, as in Fig. 2. The end *l″* of the arm *l* is furnished with a wire, *n*, as a means of connection when another switch, with accompanying shifting-box mechanism, is added to the system. The signal-case P contains a weighted lever, *o*, connected by link *q* with an arm, *r*, fast to the vertical rotary rod *s*, which carries on its upper end above the case a lantern or target-signal, T, operated from the shifting-boxes by means of the main signal-wire *m*, fast to one arm of the lever *o*.

It will be observed that the wires connecting between shifting-boxes do not have any function in operating the mechanism in the boxes, but merely extend through the said boxes as part of the main connecting-wire to the signals on either or both sides of the switches.

The transverse motion of a switch, as at F, Fig. 2, is conveyed to the sliding bar and converted into motion in the direction of the track by the means already described, and the main wire *m* pulled toward the shifting-boxes, raising the weighted lever of each signal-case, and showing the "danger" signal for the track. As soon as the switch is replaced and the main track continuous, as at E, Fig. 2, the connecting-wire *m* is slackened, and the weighted lever returns the signal to its normal position to show "safety" at each signal.

It is obvious that my device may be used in connection with a switch and a signal one way only from it, in which case the part of the mechanism of the shifting-box on the side nearest the signal is used.

I prefer to use covers on the shifting-boxes and signal-cases to protect them from the weather and danger of being interfered with. The connecting-wires may be run on rollers above ground or in pipes, or otherwise covered and protected.

I claim as my invention—

1. In combination, a railway-switch, E, reciprocating bar G, links *i i*, vibrating levers *k k*, flexible connecting-wires, sliding arms *l*, connecting-wires *m m′ n*, and signal T, all substantially as described.

2. In combination, a railway-switch throwing either or each side of the main track, a reciprocating bar, converting mechanism of the shifting-boxes and signal-cases, and connecting-wires, whereby the condition of the main track as to continuity is designated by signals at a distance from the switch, all substantially as described.

3. In a railway-switch signal, in combination, a main signal-wire, one or more switches connected with a like number of shifting-boxes provided with converting mechanism, and signals located at a distance either or each way therefrom, whereby the condition of the main track as to continuity will be indicated by each of the signals, all substantially as described.

4. In combination, signal T, vertical rod *s*, arm *r*, link *q*, weighted lever *o*, and signal-case P, all substantially as described.

AUGUSTUS H. BAKER.

Witnesses:

CHAS. L. BURDETT,

W. H. MARSH.